(12) United States Patent
Terry

(10) Patent No.: US 11,976,767 B2
(45) Date of Patent: May 7, 2024

(54) DAMPER DEVICE

(71) Applicant: Donn Scott Terry, Charlotte, NC (US)

(72) Inventor: Donn Scott Terry, Charlotte, NC (US)

( * ) Notice: Subject to any disclaimer, the term of this patent is extended or adjusted under 35 U.S.C. 154(b) by 0 days.

(21) Appl. No.: 17/894,603

(22) Filed: Aug. 24, 2022

(65) Prior Publication Data
US 2023/0064317 A1 Mar. 2, 2023

Related U.S. Application Data

(60) Provisional application No. 63/236,823, filed on Aug. 25, 2021.

(51) Int. Cl.
*F16L 55/04* (2006.01)
*F15D 1/02* (2006.01)
*F16L 23/12* (2006.01)

(52) U.S. Cl.
CPC .............. *F16L 55/04* (2013.01); *F16L 23/12* (2013.01); *F15D 1/025* (2013.01)

(58) Field of Classification Search
CPC ............ F16L 55/04; F16L 23/12; F15D 1/025
USPC .......................................................... 138/44
See application file for complete search history.

(56) References Cited

U.S. PATENT DOCUMENTS

| | | | | |
|---|---|---|---|---|
| 3,774,645 A * | 11/1973 | Pompa | ...................... | G01F 1/44 138/44 |
| 4,448,111 A * | 5/1984 | Doherty | .................. | F24F 13/06 454/261 |
| 4,516,434 A * | 5/1985 | Halmi | ....................... | G01F 1/44 73/861.64 |
| 5,421,766 A * | 6/1995 | Shank, Jr. | ............. | B24C 7/0061 451/75 |
| 5,562,746 A * | 10/1996 | Raether | .............. | B01D 46/4281 95/280 |
| 6,024,129 A * | 2/2000 | Schima | ................. | B05B 7/1472 138/40 |
| 6,071,115 A * | 6/2000 | Carbone | ................... | F23C 7/00 431/9 |
| 6,948,312 B1 | 9/2005 | Goldasz et al. | | |
| 7,299,707 B1 * | 11/2007 | Evans | ....................... | G01F 1/44 73/861.63 |
| 8,578,971 B2 * | 11/2013 | Brown | .................... | G01F 1/662 138/44 |
| 10,513,954 B2 * | 12/2019 | Fletcher | ........... | F02M 35/10222 |
| 10,697,713 B2 * | 6/2020 | Bradbury | ................ | F24H 9/146 |

(Continued)

FOREIGN PATENT DOCUMENTS

NL 1006635 C2 1/1999

OTHER PUBLICATIONS

JOA Sustainable Solutions; JOA Air Solutions; JOA Restrictor; www.joa.nl.

(Continued)

*Primary Examiner* — David R Deal
(74) *Attorney, Agent, or Firm* — Seth L. Hudson; Maynard Nexsen PC

(57) ABSTRACT

A damper device that includes an elongate body containing a passageway for fluid to flow there through and a first opening and a second opening, wherein the first opening and the second opening have an inside diameter. A throat is disposed within the body and between the first opening and the second opening of the elongate body having an inside diameter smaller than the inside diameter of the first opening and the second opening.

9 Claims, 4 Drawing Sheets

(56) References Cited

U.S. PATENT DOCUMENTS 11,248,813 B2 * 2/2022 Lin .................. F24F 7/013
2022/0341444 A1 * 10/2022 Xie .................. F15D 1/0015

OTHER PUBLICATIONS

JOA Sustainable Solutions; Single Hollow Restriction; JOA Standard Parts Library; Drawing No. JOA-NAM-SRST-002; www.joa.nl.

Improved economics through patented flow-pattern technologies; Brochure; 1997-2007; 10 pages.

\* cited by examiner

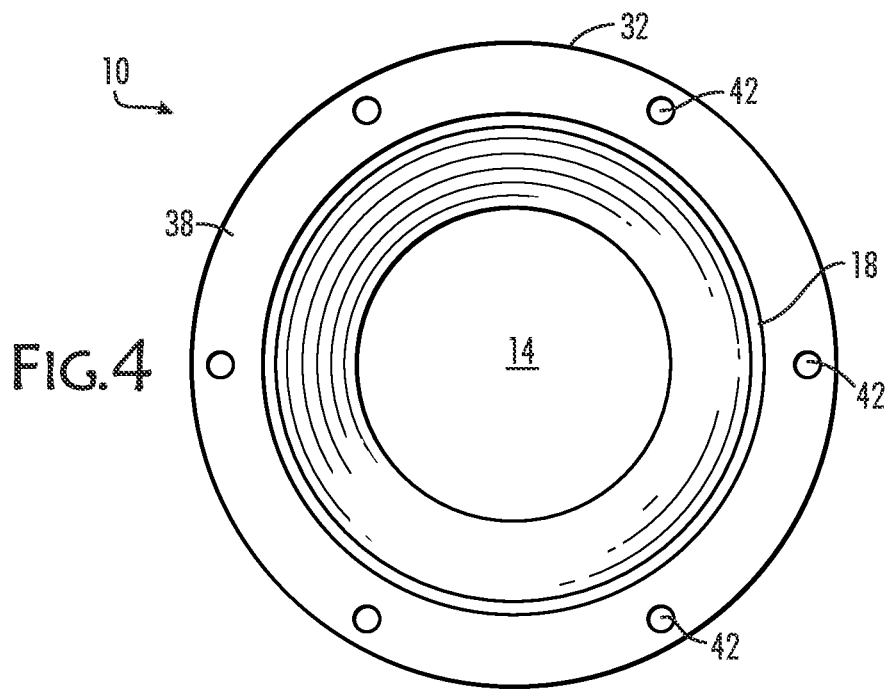
FIG.4
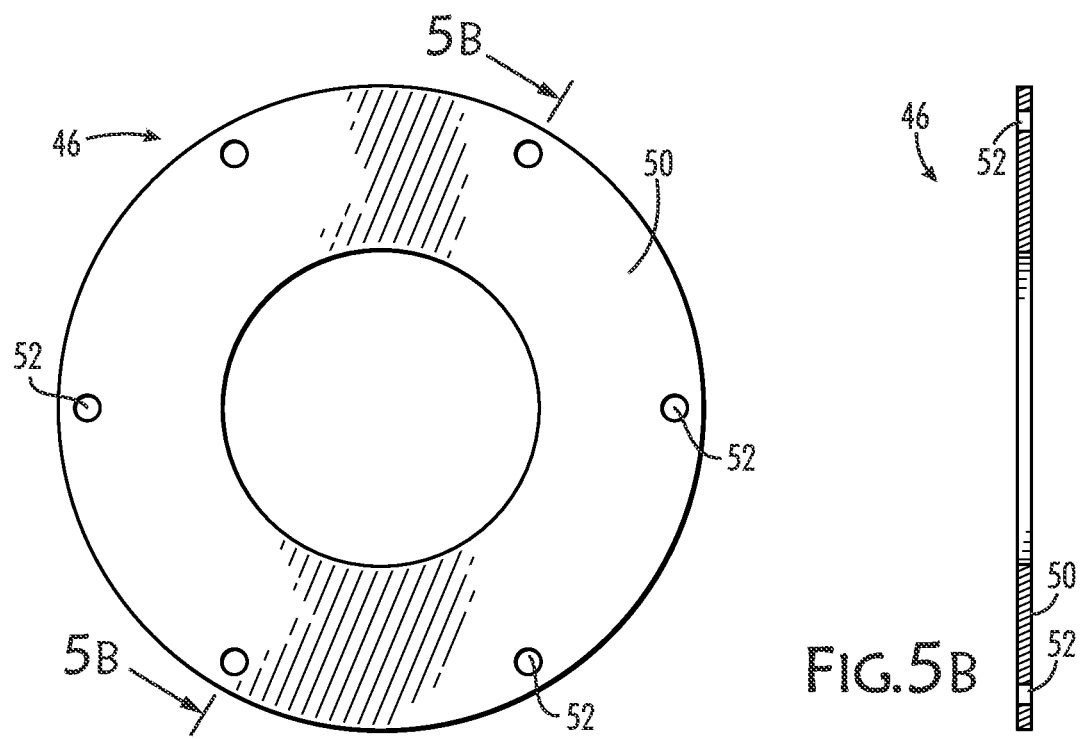
FIG.5A
FIG.5B

DAMPER DEVICE

CROSS-REFERENCE TO RELATED APPLICATION

The present patent application/patent claims the benefit of priority of U.S. Provisional Patent Application No. 63/236,823, filed on Aug. 25, 2021, and entitled "DAMPER DEVICE," the contents of which are incorporated in full by reference herein.

FIELD OF THE INVENTION

The present invention relates generally to a damper device and more generally relates to a sealed damper device without blades and containing a conical throat structure for reducing material build-up within a conduit.

BACKGROUND OF THE INVENTION

Dampers are primarily used to control fluid flow through a conduit. These dampers generally include blades disposed within the housing or body of the damper to control the flow of fluid through the damper, resulting in the control of fluid flow through a conduit the damper is engaged. The blades in these dampers are controlled manually or by a motor to control the fluid flow. Overtime the blades may fail because of material flowing through the damper, or the motor or manual device to control the blades may become inoperable. Further, prior art dampers are not completely sealed, and leak air flow. There is a need for a damper that does not contain blades and is completely sealed to effectively and efficiently control fluid flow through a conduit and reduce material build-up within the conduit.

BRIEF SUMMARY OF THE INVENTION

According to an embodiment of the present invention, a damper device that includes an elongate body containing a passageway for fluid to flow there through and a first opening and a second opening, wherein the first opening and the second opening have an inside diameter. A throat is disposed within the body and between the first opening and the second opening of the elongate body having an inside diameter smaller than the inside diameter of the first opening and the second opening.

According to another embodiment of the present invention, the damper device does not utilize blades.

According to yet another embodiment of the present invention, the damper device is composed of two or more segments selectively secured to each other.

According to yet another embodiment of the present invention, the damper device contains a circular cross-section.

BRIEF DESCRIPTION OF THE DRAWINGS

The present invention is illustrated and described herein with reference to the various drawings, in which like reference numbers denote like method steps and/or system components, respectively, and in which:

FIG. 4 is another end view of an embodiment of the damper device;

FIG. 5A is a front view of an embodiment of an engagement member;

FIG. 5B is a cut-away view of an embodiment of an engagement member shown along the line 5B-5B of FIG. 5A.

DETAILED DESCRIPTION OF THE INVENTION

Figure 1:
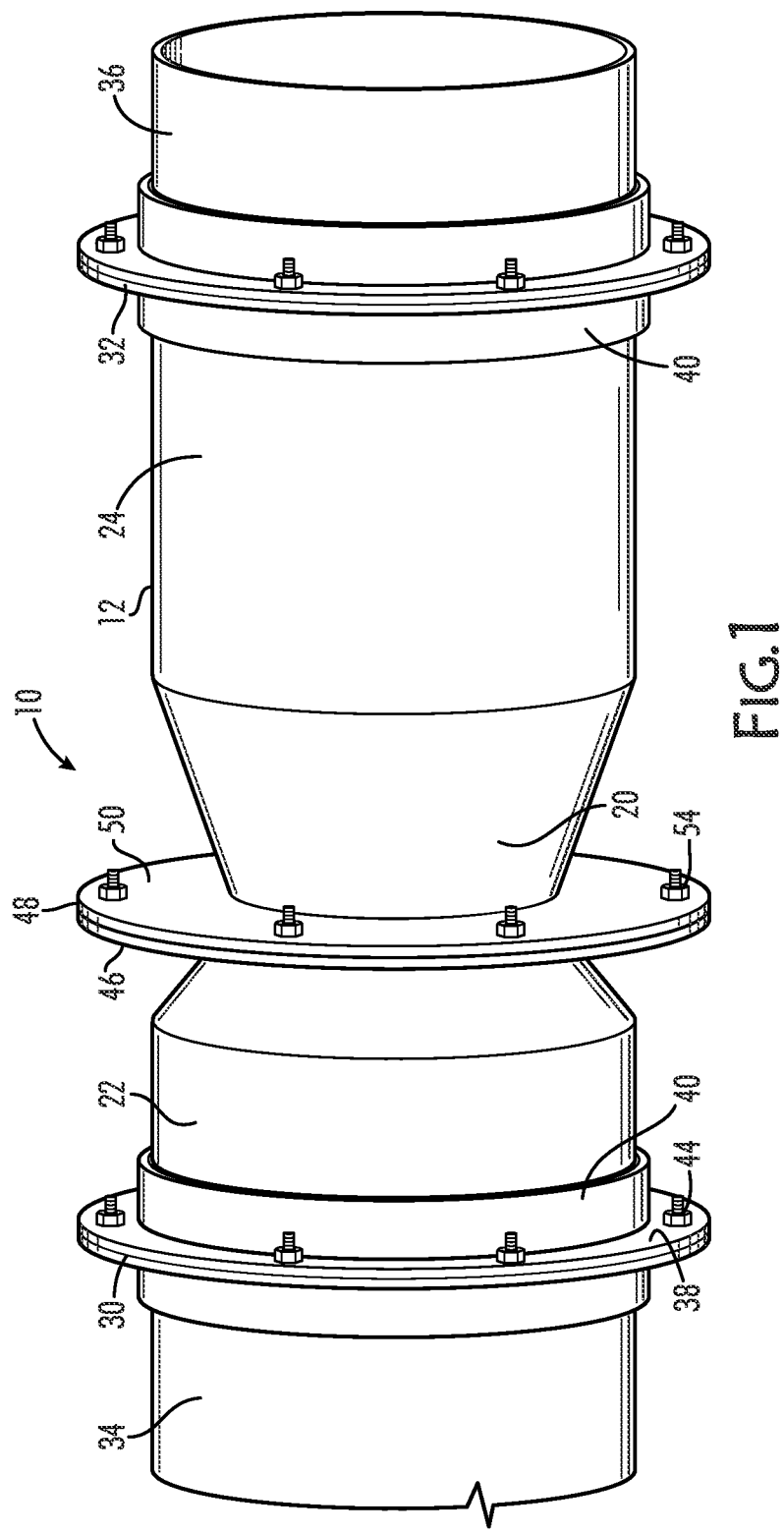
FIG. 1 is a perspective view of an embodiment of the damper device engaged to a first conduit segment and a second conduit segment.

The present invention may be understood more readily by reference to the following detailed description of the invention taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention. Any and all patents and other publications identified in this specification are incorporated by reference as though fully set forth herein.

Also, as used in the specification including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

Referring now specifically to the drawings, a damper device is illustrated in FIGS. 1-6 and shown generally at reference numeral 10. The damper device 10 comprises an elongate body 12 that is generally hollow containing a passageway 14 therein for the flow of fluid. The passageway 14 extends from a first opening 16 to a second opening 18 in the longitudinal direction along the longitudinal axis L-L of the damper device 10. The first opening 16 serves as an inlet for receiving fluid within the passageway 14, and the second opening 18 serves as an outlet to allow the fluid to exit the passageway 14. A throat 20 is formed within the body 12 that restricts the fluid flow through the passageway 14, thereby increasing the resistance to the flow of fluid. The throat 20 is disposed between the first opening 16 and the second opening 18.

Figure 2:
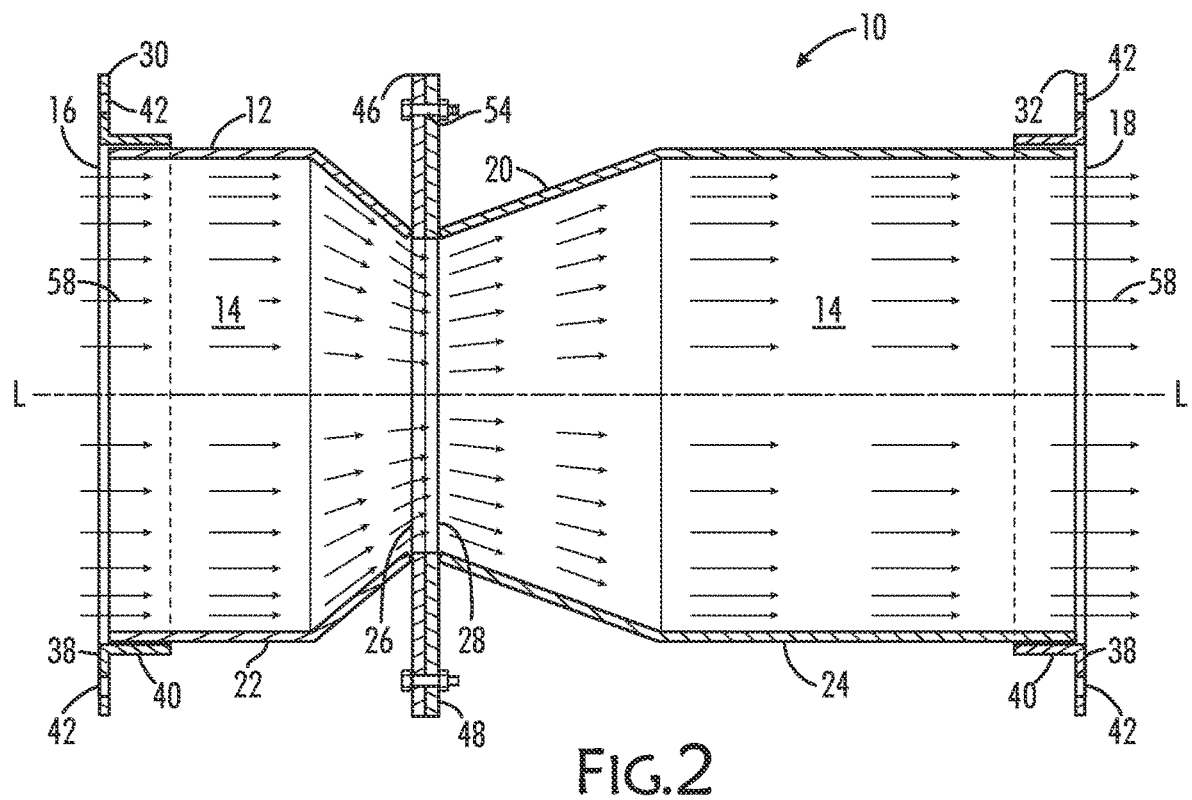
FIG. 2 is a cut-away side view of an embodiment of the damper device along the line 2-2 of FIG. 3.
Figure 3:
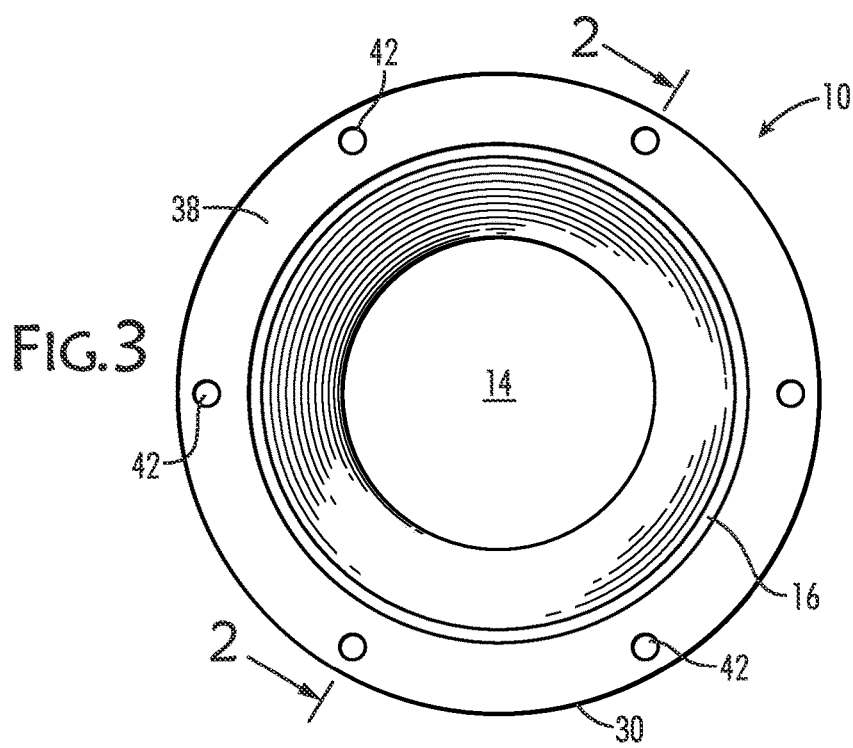
FIG. 3 is an end view of an embodiment of the damper device.

As shown in FIGS. 3 and 4, the first opening 16, the second opening 18, and the passageway 14 have a circular cross-section. The body 12 generally has an "hour glass" shape, wherein the outside diameter of the first opening 16 and the outside diameter of the second opening 18 is greater than the outside diameter at a point between the first opening 16 and the second opening 18 as shown in FIG. 2. The inside diameter of the body 12 at the first opening 16 and the inside diameter of the second opening 18 is greater than the inside diameter of the body 12 at the throat 20, disposed between the first opening 16 and the second opening 18. While a circular cross-section and "hour glass" shape is illustrated in the figures and described herein, it should be noted the cross-section of the first opening 16, the second opening 18, and the passageway 14 is not limited to a circular cross-section and may include any other cross-sectional configuration, including, but not limited to, a square or rectangular cross-section. Likewise, the shape of the body 12 or any of its constituent segments is not limited to an "hour glass" shape and may include any other shape, including, but not limited to a cube or block shape.

In one embodiment, the body 12 is a single, integral unit. Alternatively, and as shown in the figures, the body 12 may be modular and composed of sections selectively secured to each other, collectively forming the body 12 and having the same structure as described above. As illustrated, the body 12 may be composed of two or more segments. As illustrated in FIG. 1, the body 12 is composed of a two segments—a first segment 22 and a second segment 24. To comprise the entire body 12 of this embodiment, the first segment 22 is fluidly engaged to the second segment 24.

As illustrated in FIG. 1, the first segment 18 contains the first opening 16, configured as an inlet to the damper device 10 and an exit opening 26 disposed opposite the first opening 16 on the opposite end of the first segment 18 in the longitudinal direction. The second segment 24 contains the second opening 18, configured as an outlet to the damper device 10 and an inlet opening 28 disposed opposite the second opening 18 on the opposite end of the second segment 24 in the longitudinal direction.

The damper device 10 preferably contains at least one mating member for engaging the damper device 10 to a conduit. More preferably, the damper device 10 contains a first mating member 30 for fluidly engaging the first opening 16 of the damper device 10 to a first conduit segment 34 and a second mating member 32 for fluidly engaging the second opening 18 to a second conduit segment 36. The first mating member 30 and the second mating member 32 extend outwardly from the elongate body 12 and configured to fluidly engage the first opening 16 to a first conduit segment 34 and the second opening 18 to a second conduit segment 36. The first mating member 30 is proximate the first opening 16 and the second mating member 32 is proximate the second opening 18, wherein the first mating member 30 extends outwardly from the first opening 16, whereby the first mating member 30 extends perpendicular, orthogonally, are at an angle with respect to the longitudinal axis L-L of the damper device 10 and the second mating member 32 extends outwardly from the second opening 18, whereby the second mating member 32 extends perpendicular, orthogonally, are at an angle with respect to the longitudinal axis L-L of the damper device 10. The first mating member 30 and the second mating member 32 are not required for the damper device 10.

Figure 6:
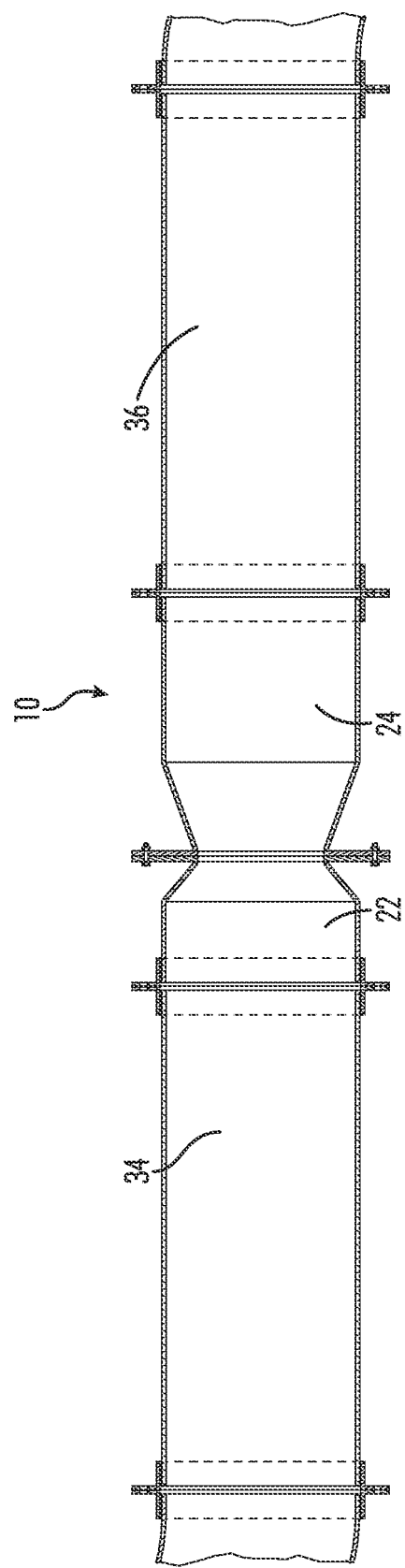
FIG. 6 is a cross-sectional view of an exemplary damper device engaged to a first conduit segment and a second conduit segment.

As illustrated, the first mating member 30 extends axially from the first opening 16 and perpendicular to the longitudinal axis L-L of the damper device 10. Likewise, the second mating member 32 extends axially from the second opening 18 and perpendicular to the longitudinal axis L-L of the damper device 10. The first mating member 30 is configured to be engaged to a first conduit segment 34 and the second mating member 32 is configured to be engaged to a second conduit segment 36. The first conduit segment 34 and the second conduit segment 36 may be any structure or conduit that fluid flows, such as a pipe or duct. Fluid means a gas, including air that may proceed through a duct or pipe, or water that may proceed through a pipe. As illustrated in FIG. 6, the fluid is air that flows through the first conduit segment 34, the second conduit segment 36, and the damper device 10. The first mating member 30 and the second mating member 32 have a circular cross-section, wherein the first mating member 30 circumscribes the first opening 16 and the second mating member 32 circumscribes the second opening 18, as illustrated in FIGS. 3 and 4, when the first opening 16 and second opening 18 have a circular cross-section. The first mating member 30 and the second mating member 32 may have any other size or dimension that corresponds to the geometric cross-section of the first opening 16 and second opening 18.

The first mating member 30, as illustrated in FIG. 4, contains an engaging flange 38, that surrounds an opening having an interior surface and an exterior surface. Likewise, the second mating member 32, as illustrated in FIG. 3, contains an engaging flange 38, that surrounds an opening having an interior surface and an exterior surface. A collar 40 extends outwardly from the interior surface of the engaging flange 38 and preferably perpendicular to the interior surface of the engaging flange 38. The collar 40 is proximate the opening of both the first mating member 30 and the second mating member 32, and preferably extends outwardly proximate the inner edge of the first mating member 30 and the second mating member 32 surrounding the opening, wherein the inner edge of the first mating member 30 and the second mating member 32 is configured to serve as the outer boundary of the opening of the first mating member 30 and the second mating member 32. The collar 40 preferably has an inside diameter slightly larger than the outside diameter of the body 12 proximate the first opening 16 and the collar 40 preferably has an inside diameter slightly larger than the outside diameter of the body 12 proximate the second opening 18. The collar 40 of the first mating member 30 is attachable to the exterior surface of the body 12 proximate the first opening 16 such that the engagement flange 38 extends axially from the first opening 16 and perpendicular to the longitudinal axis L-L of the damper device 10, wherein the collar 40 may be attached by an adhesive or a mechanical device. Likewise, the collar 40 of the second mating member 30 is attachable to the exterior surface of the body 12 proximate the second opening 18 such that the engagement flange 38 extends axially from the second opening 18 and perpendicular to the longitudinal axis L-L of the damper device 10, wherein the collar 40 may be attached by an adhesive or a mechanical device.

The exterior surface of the engagement flange 38 of the first mating member 30 is configured to be engaged to the first conduit segment 34, and the exterior surface of the engagement flange 38 of the second mating member 32 is configured to be engaged to the second conduit segment 36. Attachment bores 42 are disposed within the engagement flange 38, extending from the exterior surface to the interior surface and configured to receive an attachment device 44, such as a bolt, screw, rivet, or the like. The attachment device 44 is positionable within the attachment bore 42 for fluidly engaging the damper device 10 to the first conduit segment 34. As illustrated, each flange 38 contains a plurality of spaced-apart attachment bores 42 within the flange 38 and extending from the exterior surface to the interior surface with each attachment bore 42 configured to receive an attachment device 44 positionable within each attachment bore 42. The attachment device 44 may be received within a corresponding bore within the first conduit segment 34 and the second conduit segment 36 engaging the first mating member 30 to the first conduit segment 34 and the second mating member 32 to the second conduit segment 36.

The first segment 22 has a circular cross-section and is generally cylindrical as it initially progresses from the first opening 16 to the exit opening 26. The diameter of the first segment 22 from the first opening 16 to a point along the length of the first segment 22, where the length is the distance from the first opening 16 along the longitudinal axis L-L, remains constant. After the point along the length of the first segment 22, the diameter of the first segment 22 gradually decreases in diameter from the point to the exit opening 26. The angle θ of the first segment 22 gradually decreases between about 1° and about 89°, including all points in-between. Similarly, the second segment 24 has a circular cross-section and is generally cylindrical as it initially progresses from the second opening 18 to the inlet opening 28. The diameter of the second segment 24 from the second opening 18 to a point along the length of the second segment 24, where the length is the distance from the second opening 18 along the longitudinal axis L-L, remains constant. After the point along the length of the second segment 24, the diameter of the second segment 24 gradually decreases in diameter from the point to the inlet opening 28. The angle θ of the second segment 24 gradually decreases between about 1° and about 89°, including all points in-between. The configuration of the first segment 22 and the second segment 24, when engaged to each other provide the "hour glass" shape of the elongate body 12 of the damper device 10.

The first opening 16 and the second opening 18 may have the same diameter or a different diameter depending upon the uses of the user. The portions of the first segment 22 and the second segment 24 with gradually decreasing diameters collectively form the throat 20 of the damper device 10.

The damper device 10 preferably contains at least one engagement member for engaging the first segment 22 to the second segment 24. More preferably, the damper device 10 contains a first engagement member 46 and a second engagement member 48 for fluidly engaging the first segment 22 to the second segment 24. The first engagement member 46 and the second engagement member 48 extend outwardly from the first segment 22 and the second segment 24, collectively forming the body 12, and configured to fluidly engage the exit opening 26 of the first segment 22 to the inlet opening 28 of the second segment 24. The first engagement member 46 is proximate the exit opening 26 and the second engagement member 48 is proximate the inlet opening 28.

As illustrated, the first engagement member 46 extends axially from the exit opening 26 and perpendicular to the longitudinal axis L-L of the damper device 10. Likewise, the second engagement member 48 extends axially from the inlet opening 28 and perpendicular to the longitudinal axis L-L of the damper device 10. The first engagement member 46 is configured to be engaged to the second engagement member 48. The first engagement member 46 and the second engagement member 48 have a circular cross-section, wherein the first engagement member 46 circumscribes the exit opening 26 and the second engagement member 48 circumscribes the inlet opening 28, when the exit opening 26 and inlet opening 28 have a circular cross-section. The first engagement member 46 and the second engagement member 48 may have any other size or dimension that corresponds to the geometric cross-section of the exit opening 26 and the inlet opening 28.

The first engagement member 46 contains an engagement flange 50 that surrounds the exit opening 26 having an interior surface and an exterior surface. Likewise, the second engagement member 48 contains an engagement flange 50 that surrounds the inlet opening 28 having an interior surface and an exterior surface.

The exterior surface of the engagement flange 50 of the first engagement member 46 is configured to be engaged to the exterior surface of the second engagement member 48. Engaging bores 52 are disposed within the engagement flange 50, extending from the exterior surface to the interior surface and configured to receive an engagement device 54, such as a bolt, screw, rivet, or the like. The engagement device 54 is positionable within the engaging bore 52 for fluidly engaging the first engagement member 46 to the second engagement member 48. As illustrated, each engagement flange 50 contains a plurality of spaced-apart engaging bores 52 within the engagement flange 50 and extending from the exterior surface to the interior surface with each engaging bore 52 is configured to receive an engagement device 54 positionable within each engaging bore 52. The engagement device 54 may be received within an engaging bore 52 on the first engagement member 46 and a corresponding engaging bore 52 within the second engagement member 48.

The inside and outside diameter of the exit opening 26 and the inlet opening 28 are preferably the same. The outer diameter of the engagement flange 50 of the first engagement member 46 is preferably the same as the outer diameter of the engagement flange 50 of the second engagement member 48.

Optional testing ports may be included within the elongate body 12 of the damper device 10 and within either the first segment 22 or the second segment 24, or within both the first segment 22 and the second segment 24. The testing ports may be sealed by a cap when not in use, and allow a user to insert a testing device through the testing port and into the air flow within the passageway 14. An optional plate label may be engaged to the external surface of the body 12 for displaying indicia, such as a company name and/or brand name.

As shown in FIG. 6, an air flow 58 flows through the damper device 10 from the first conduit segment 34 to the second conduit segment 36. The air flow 58 exits the first conduit segment 34 and enters the inlet of the body 12 through the first opening 16 in the first segment 22. The air flow 58 proceeds through the passageway 14 in the first segment 22 and into the portion of the first segment 22 where the diameter gradually decreases, which also serves as the inlet to the throat 20. The structure of the throat 20 is defined as the gradually decreasing diameter of the first segment 22 in the direction from the first opening 16 to the exit opening 26 in the longitudinal direction of the longitudinal axis L-L, and the second segment 24 in the direction of the second opening 18 to the inlet opening 28 in the longitudinal direction of the longitudinal axis L-L. This structure of the throat 20 within the first segment 22, caused by the gradual decrease in diameter, causes an increase in resistance within the body 12 at the throat 20 of the air flow 58, resulting in an increase in the velocity and an increase in pressure of the air flow 58. As the air flow 58 enters the inlet opening 28 of the second segment 24, the diameter of the second segment 24 gradually increases from the perspective of the air flow 58 along the longitudinal axis from the inlet opening 28 to the second opening 18. The gradual increase of the diameter of the second segment 24 has a regain factor, meaning some of the pressure lost within the gradual diameter decrease in the first segment 22 is regained through the throat 20 structure because of the gradual increase in diameter of the second segment 24 from the inlet opening 28 to a point along the length of the second segment 24. Further, the air flow 58 exiting the second segment 24, sweeps the bottom of the second conduit segment 36, engaged to the second mating member 32, to keep the second conduit segment 36 clean and prevent build-up of debris within the second conduit segment 36. In other words, the damper device 10 reduces material buildup in the second conduit segment 36 to which it is attached.

The passageway 14 contains no obstructions, such as blades or the like typically used to control the flow of fluid, such as air, through a damper. The present invention is a bladeless damper device 10. The internal surface of the first segment 22 and the second segment 24 that serves as the outer bounds of the passageway 14 is smooth and does not contain any ridges, protrusions and the like.

The damper device 10 is preferably composed of metal, such as sheet metal, but may be composed of other materials suitable for its intended purpose, such as plastic and composites thereof. The damper device 10 may also be power coated.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:

1. A damper device for engagement to a first conduit segment and a second conduit segment, comprising:
    a first segment with a circular cross-section containing a first opening and an exit opening, the diameter of the first segment from the first opening to a point along the longitudinal axis of the damper device is constant and thereafter the diameter gradually decreases to the exit opening;
    a second segment with a circular cross-section containing an inlet opening and a second opening, the diameter of the second segment from the second opening to a point along the longitudinal axis of the damper device is constant and thereafter the diameter gradually decreases to the inlet opening;
    the first segment and the second segment are fluidly coupled, wherein a passageway with a circular cross-section extends between the first opening in the first segment and the second opening in the second segment
    a first engagement member extending axially outward from the exit opening and a second engagement member extending axially outward from the inlet opening, wherein the first engagement member and the second engagement member are engaged to each other to fluidly couple the first segment to the second segment; and
    a throat is disposed between the first opening and the second opening with an inside diameter less than the inside diameter of the first opening and the second opening;
    whereby, the damper device does not contain any blades within the damper device.

2. The damper device according to claim 1, wherein the first segment and the second segment have a circular cross-section.

3. The damper device according to claim 1, further comprising a first mating member extending axially outward from the first opening for engaging the damper device to the first conduit segment and a second mating member extending axially outward from the second opening for engaging the damper device to the second conduit segment.

4. The damper device according to claim 1, further comprising a testing portion disposed within the elongate body.

5. A damper device for engagement to a first conduit segment and a second conduit segment, comprising:
    a first segment with a circular cross-section containing a first opening, an exit opening, and a first mating member;
    a second segment with a circular cross-section containing an inlet opening, a second opening, and a second mating member;
    a first engagement member proximate the exit opening of the first segment extending axially from the exit opening and perpendicular to the longitudinal axis of the damper device;
    a second engagement member proximate the inlet opening of the second segment extending axially from the inlet opening and perpendicular to the longitudinal axis of the damper device, the first engagement member and second engagement member are engaged for fluidly coupling the first segment and the second segment, wherein a passageway with a circular cross-section extends between the first opening in the first segment and the second opening in the second segment along the longitudinal axis of the damper device; and
    a throat is disposed between the first opening and the second opening with an inside diameter less than the inside diameter of the first opening and the second opening;
    whereby, the damper device does not contain any blades within the damper device.

6. The damper device according to claim 5, wherein the first segment and the second segment have a circular cross-section.

7. The damper device according to claim 5, wherein the first mating member extends axially outward from the first opening for engaging the damper device to the first conduit segment and the second mating member extending axially outward from the second opening for engaging the damper device to the second conduit segment.

8. The damper device according to claim 5, wherein the first engagement member extends axially outward from the exit opening and the second engagement member extends axially outward from the inlet opening, wherein the first engagement member and the second engagement member are engaged to each other to fluidly couple the first segment to the second segment.

9. The damper device according to claim 5, further comprising a testing portion disposed within the elongate body.

* * * * *